(12) United States Patent
Chen et al.

(10) Patent No.: US 12,555,007 B2
(45) Date of Patent: Feb. 17, 2026

(54) METHOD AND SYSTEM FOR INFERRING DEVICE FINGERPRINT

(71) Applicant: HITRUST.COM INCORPORATED, Grand Cayman (KY)

(72) Inventors: Hsin-Hung Chen, Taipei (TW); Jen-Hao Tsai, Taipei (TW); See Sang Ho, Taipei (TW)

(73) Assignee: HITRUST.COM INCORPORATED, Grand Cayman (KY)

( * ) Notice: Subject to any disclaimer, the term of this patent is extended or adjusted under 35 U.S.C. 154(b) by 833 days.

(21) Appl. No.: 17/940,768

(22) Filed: Sep. 8, 2022

(65) Prior Publication Data
US 2023/0401465 A1   Dec. 14, 2023

(30) Foreign Application Priority Data
Jun. 8, 2022   (TW) .................................. 111121217

(51) Int. Cl.
*G06N 5/04* (2023.01)
(52) U.S. Cl.
CPC ...................................... *G06N 5/04* (2013.01)
(58) Field of Classification Search
None
See application file for complete search history.

(56) References Cited

PUBLICATIONS

Schwarz, Software-based Side-Channel Attacks and Defenses in Restricted Environments, Doctoral Thesis, Graz University of Technology, Nov. 2019, pp. 1-367 (Year: 2019).*

Lipp, Exploiting Microarchitectural Optimizations from Software, Doctoral Thesis, Graz University of Technology, Aug. 2021, pp. 1-336 (Year: 2021).*

* cited by examiner

*Primary Examiner* — Wilbert L Starks
(74) *Attorney, Agent, or Firm* — Maschoff Brennan

(57) ABSTRACT

A method for inferring device fingerprint, performed by a processor, includes: obtaining a current device dataset including current device features from a user interface operating on a user device, when the current device dataset further includes a current protocol address and a device fingerprint pointer table does not include a current number of a target device fingerprint pointer corresponding to the current protocol address, obtaining a history protocol address, first history device features and first history number of the target device fingerprint pointer, when the current protocol address matches the history protocol address and the current device features matches the first history device features, using one first history number as the current number, and when the current protocol address does not match the history protocol address and the current device features matches the first history device features, setting the current number to point to a new device fingerprint.

17 Claims, 6 Drawing Sheets

METHOD AND SYSTEM FOR INFERRING DEVICE FINGERPRINT

CROSS-REFERENCE TO RELATED APPLICATIONS

This non-provisional application claims priority under 35 U.S.C. § 119(a) on Patent Application No(s). 111121217 filed in Republic of China (ROC) on Jun. 8, 2022, the entire contents of which are hereby incorporated by reference.

BACKGROUND

1. Technical Field

This disclosure relates to a method and system for inferring device fingerprint.

2. Related Art

Lately, due to COVID-19, most people choose to stay home and purchase products online through various E-commerce platforms. However, for the sake of convenience, many people use the same password for different accounts, and some hackers take advantage of this phenomenon. First, the hackers buy leaked accounts from the dark web, and then use "credential stuffing" to guess the password to log in to the membership system of other e-commerce platforms, steal credit cards information or buy a lot of game points, and when the person with the stolen account refuses to pay, the e-commerce platform suffers heavy losses.

In the prevention mechanism of avoiding account theft, device fingerprint can be used as an enhanced technology, which can be used for device identification by collecting device information. However, even on the same device, the device feature collected from a browser can be different from the device feature collected from an application, resulting in multiple device fingerprints under the same device. In other words, different device fingerprints are regarded as different devices, resulting in the customer device information obtained by the e-commerce side to be fragmented. Therefore, the risk of account theft is still high.

SUMMARY

Accordingly, this disclosure provides a method and system for inferring device fingerprint.

According to one or more embodiment of this disclosure, a method for inferring device fingerprint, performed by a processor, includes: obtaining a current device dataset from a user interface operating on a user device, wherein the current device dataset comprises multiple current device features; when the current device dataset further comprises a current protocol address and a device fingerprint pointer table does not comprise a current number of a target device fingerprint pointer corresponding to the current protocol address, obtaining a history protocol address, multiple first history device features and at least one first history number of the target device fingerprint pointer associated with the user device according to the current protocol address; when the current protocol address matches the history protocol address and the current device features match the first history device features, using one of the at least one first history number as the current number of the target device fingerprint pointer; and when the current protocol address does not match the history protocol address and the current device features match the first history device features, creating a new device fingerprint and setting the current number of the target device fingerprint pointer to point to the new device fingerprint.

According to one or more embodiment of this disclosure, a system for inferring device fingerprint includes: a memory configured to store a device fingerprint pointer table, a history protocol address, multiple the first history device features and at least one first history number of a target device fingerprint pointer associated with a user device; and a processor connected to the memory, the processor configured to perform the above described method for inferring device fingerprint.

In view of the above description, through the system and method for inferring device according to one or more embodiments of the present disclosure, when the user interface on the user device switches from one the browser to another browser, switches from a browser to an application, or switches from an application to a browser, an inferred result of the device using these browser or application are the same user device may still be obtained. In addition, in a scenario where multiple user devices with different models are in the same environment (for example, connected to the same wireless network), the device fingerprints of the user devices may still be inferred.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth to provide a thorough understanding of the disclosed embodiments. According to the description, claims and the drawings disclosed in the specification, one skilled in the art may easily understand the concepts and features of the present invention. The following embodiments further illustrate various aspects of the present invention but are not meant to limit the scope of the present invention.

Through the system and method for inferring device fingerprint according to one or more embodiments of the present disclosure, even if the same user device runs under the same internet environment or different internet environments, the user device runs different browsers, or the same user device runs a browser and an application, it can infer that the device running these browsers/applications is the same user device. Therefore, vendors (for example, E-commerce, bank, security firm etc.) using the system and method for inferring device fingerprint according to one or more embodiments of the present disclosure may obtain user device information that is not fragmented, thereby reducing the risk of user account being hacked.

Figure 1:
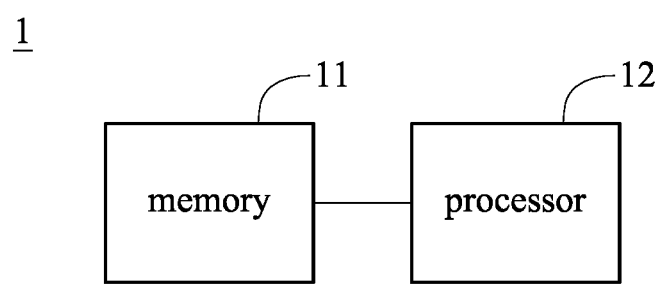
FIG. 1 is a block diagram illustrating a system for inferring device fingerprint according to an embodiment of the present disclosure.
Figure 2:
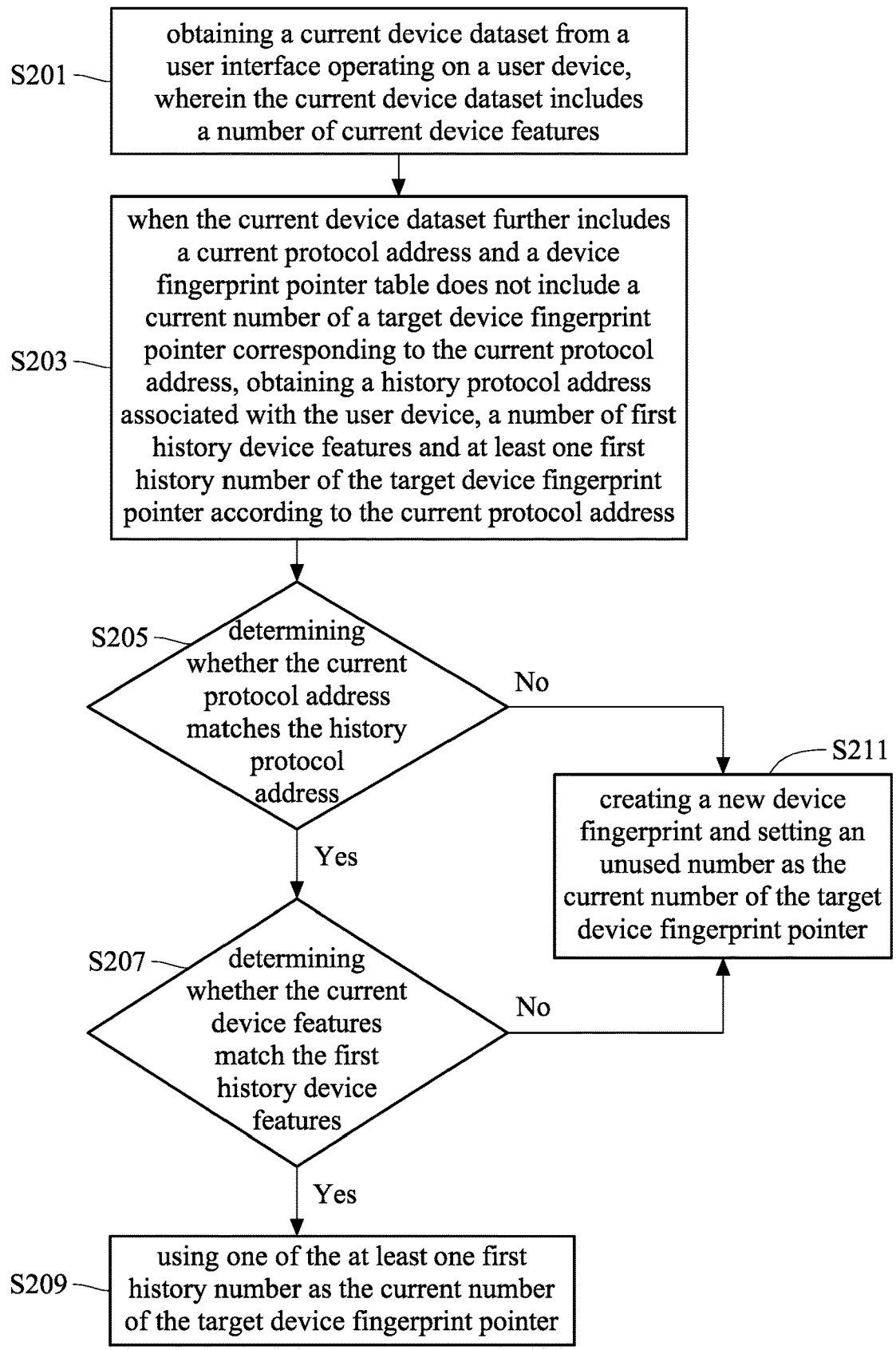
FIG. 2 is a flowchart illustrating a method for inferring device fingerprint according to an embodiment of the present disclosure.

To explain the system and method for inferring device fingerprint according to one or more embodiments of the present disclosure in more detail, please refer to FIG. 1 and FIG. 2, wherein FIG. 1 is a block diagram illustrating a system for inferring device fingerprint according to an embodiment of the present disclosure, and FIG. 2 is a flowchart illustrating a method for inferring device fingerprint according to an embodiment of the present disclosure.

As shown in FIG. 1, the system for inferring device 1 according to an embodiment of the present disclosure includes a memory 11 and a processor 12, wherein the memory 11 may be in communication connection with the processor 12, or the memory 11 may be electrically connected to the processor 12. The memory 11 is preferably a non-volatile memory (NVM), such as a read-only memory (ROM), an electrically-erasable programmable read-only memory (EEPROM) or a flash memory etc., but the present disclosure is not limited thereto. The processor 12 may be implemented with a central processing unit, a programmable logic device (PLD), or an application specific integrated circuit (ASIC) etc., but the present disclosure is not limited thereto. The memory 11 is configured to store a device fingerprint pointer table, a history protocol address, multiple first history device features and at least one first history number of a target device fingerprint pointer associated with a user device.

The device fingerprint pointer table may be used to store pointer number of the user device. One pointer number represents one pointer pointing to one device fingerprint and said device fingerprint may be generated according to one dataset described below, wherein said device fingerprint may be a unique device identifier (UDID), which may be regarded as a unique identifier generated according to digital footprint of the user device. In other words, the device fingerprint pointer table may have a current number representing where the pointer points to, which is used to indicate a current device fingerprint of the user device; and if the device fingerprint pointer table does not have the current number, it means the processor 12 does not obtain a current device fingerprint of the user device. The history protocol address may be the Internet protocol address (IP address) previously used by the user device and may include intranet IP address and IP address of extranet, wherein the processor 12 may obtain intranet IP address through web real-time communication (web RTC). The processor 12 may perform the method for inferring device fingerprint according to one or more embodiments of the present disclosure according to above-described data stored by the memory 11.

The method for inferring device fingerprint according to an embodiment of the present disclosure may be performed by the processor 12 of the system for inferring device 1, and as shown in FIG. 2, may include: step S201: obtaining a current device dataset from a user interface operating on a user device, wherein the current device dataset includes a number of current device features; step S203: when the current device dataset further includes a current protocol address and a device fingerprint pointer table does not include a current number of a target device fingerprint pointer corresponding to the current protocol address, obtaining a history protocol address, a number of first history device features and at least one first history number of the target device fingerprint pointer associated with the user device according to the current protocol address; step S205: determining whether the current protocol address matches the history protocol address; if the result of step S205 is "yes", performing step S207: determining whether the current device features match the first history device features; if the result of step S207 is "yes", performing step S209: using one of the at least one first history number as the current number of the target device fingerprint pointer; and when the result of step S205 or step S207 is "no", performing step S211: creating a new device fingerprint and setting an unused number as the current number of the target device fingerprint pointer. It should be noted that, step S205 is illustrated as performed before step S207 in FIG. 2, but step S205 may also be performed after step S207 or performed at the same time with step S207.

In step S201, the processor 12 may be connected to the user device through software development kit (SDK) to obtain the current device dataset from the user interface currently operated on the user device, wherein the user device may include a notebook computer, a tablet, a smart phone, etc., and the user interface may be a browser or an application. For example, the processor 12 may obtain android archive from the user device using Android system through-SDK, obtain framework file from the user device using iOS through SDK, and obtain the current device dataset from the android archive or the framework file. In the embodiment of the user interface being a browser, SDK may be implemented through JavaScript programming language; in the embodiment of the user interface being an application, since the application may have an embedded browser (webview), SDK may be implemented with webview and native code. That is, webview may be regarded as the user interface.

The current device dataset includes multiple current device features of the user device, and the current device features may include data of one or more of hardware parameters, operating system parameters, browser parameters and geographic parameters associated with IP address corresponding to the user device. In particular, the hardware parameters may include a device type, a device model, a device brand, a processor architecture, a device pointing method, a maximum touch point and an audio fingerprint of the user device; the operating system parameters may include an operating system name, an operating system platform, a screen resolution width, a screen resolution height and a color depth of the user device; the browser parameters may include a language code, a language fingerprint, a browser canvas fingerprint, a font fingerprint and a WebGL fingerprint of the user device; and the geographic parameters associated with IP address may include a source internet protocol, a request internet protocol and an Intranet internet protocol. It should be noted that, the current device features of the current device dataset preferably include more than one of the 15 data types listed above, and according to usage need, the current device features of the current device dataset may also include other data that is not listed herein.

In addition, since it is possible that a part of the features among the current device features are not correct, the processor 12 may also store a fact table associated with the above parameters. For example, for a smartphone with the device brand being Apple, the fact table may store the corresponding operating system name being iOS; and for a smartphone with the device brand being Samsung, the fact table may store the corresponding operating system name being Android. Accordingly, after obtaining the current device features, the processor 12 may first select features from the current device features that match the fact table according to the fact table, then perform the following steps according to the selected features.

In step S203, when the processor 12 determines the IP address (the current protocol address) that the user device currently uses can be obtained and determines the device fingerprint pointer table does not include the current number of the target device fingerprint pointer corresponding to the current protocol address, the processor 12 obtains the history protocol address, the first history device features and the at least one first history number of the target device fingerprint pointer associated with the user device from the memory 11 according to the current protocol address, wherein the target device fingerprint pointer indicates a pointer of a device fingerprint to be determined of the current user device. Specifically, the memory 11 may be a memory of the vendor side that provides the user interface, the memory 11 may also be the memory at the processor 12 side. The device fingerprint pointer table may be stored in a pointer database (PointerDB) at the user interface side or a pointer database of the webview at the application side, the device fingerprint pointer table may also be stored in a database at the processor 12 side, and may be stored in the pointer database at the browser side at the same time or stored in the pointer database of the webview at the application side and the database at the processor 12 side.

Since the update frequency of said intranet IP address is not high, it means that the current intranet IP address is likely to be the same as the history intranet IP address. Therefore, the processor 12 may find one history protocol address associated with the current protocol address (for example, the same intranet IP address) from multiple history protocol addresses according to the intranet IP address and extranet IP address, and find the corresponding the first history device features and the at least one first history number according to the history protocol address associated with the current protocol address.

The first history device features may include data of more than one of the parameters listed above, and the first history device features may be previous device features of the user device collected by the processor 12. The at least one first history number refers to the previously generated device fingerprint of the user device, and may be obtained from the pointer database of the browser, wherein a number of the first history numbers may be one or more, and may be generated by performing hash calculation or random number calculation on the history protocol address and the first history device features.

It should be noted that, the processor 12 determining the device fingerprint pointer table not including the current number of the target device fingerprint pointer corresponding to the current protocol address may include at least one of the three following conditions: the current number of the target device fingerprint pointer is a null value; the device fingerprint pointer table does not include the target device fingerprint pointer; and, based on system log, a clear (deletion) tag is found between the current number of the target device fingerprint pointer and the history number the pointer database of the browser.

In step S205, the processor 12 may determine whether the current protocol address matches the history protocol address, meaning the processor 12 determines whether the current IP address is the same as the previous IP address. When the processor 12 determines the current protocol address matches the history protocol address, the processor 12 may further perform step S207 to determine whether the current device features match the first history device features obtained in step S203 to further determine whether the current user device and the user device corresponding to the history protocol address, the first history device features and the at least one first history number are the same device. In detail, in step S207, the processor 12 may select multiple parameters from the 15 parameters of the user device listed above, and determine the current device features match the first history device features when data of the current device features corresponding to the parameters is completely the same as data of the first history device features corresponding to the parameters, or when a number of pieces of data of the current device features corresponding to the parameters being the same as data of the first history device features corresponding to the parameters reaches a default number, wherein the default number may be 5, but the present disclosure does not limit the default number. When the processor 12 determines the current device features match the first history device features, the processor 12 performs step S209 for the device fingerprint pointer table to include the current number of the target device fingerprint pointer. That is, one of the at least one first history number serves as the current number of the target device fingerprint pointer.

If the current protocol address is determined as not matching the history protocol address in step S205, or the current device features is determined as not matching the first history device features in step S207, the processor 12 performs step S211 to create the new device fingerprint of the user device, and use an unused number as the current number of the target device fingerprint pointer pointing to this new device fingerprint, wherein the processor 12 may obtain the new device fingerprint by performing hash calculation on the current protocol address and the current device features. Accordingly, when the user interface on the user device is switched from a browser to another browser, the processor 12 may still infer a result of the device using these two browsers are the same user device. In addition, under a situation where multiple user devices of the same model existing in the same environment (for example, connected to the same wireless network), the device fingerprint of each of the user devices may still be inferred according to the above steps.

Figure 3:
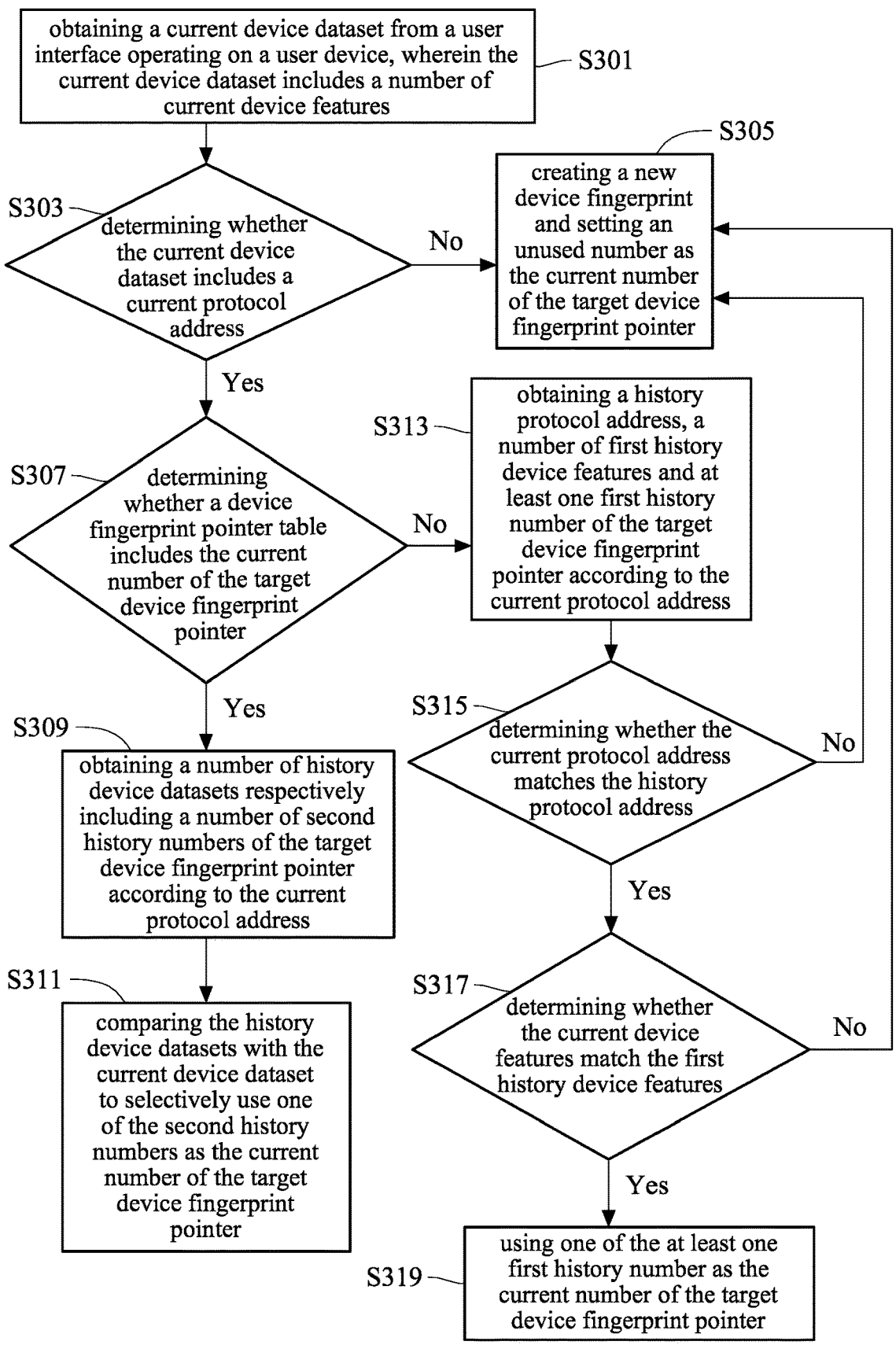
FIG. 3 is a flowchart illustrating a method for inferring device fingerprint according to another embodiment of the present disclosure.

Please refer to FIG. 1 and FIG. 3, wherein FIG. 3 is a flowchart illustrating a method for inferring device fingerprint according to another embodiment of the present disclosure and may be performed by the processor 12. As shown in FIG. 3, the method for inferring device fingerprint according to another embodiment of the present disclosure may include: step S301: obtaining a current device dataset from a user interface operating on a user device, wherein the current device dataset includes a number of current device features; step S303: determining whether the current device dataset includes a current protocol address; if the result of step S303 is "yes", performing step S305: creating a new device fingerprint and setting an unused number as the current number of the target device fingerprint pointer; if the result of step S303 is "no", performing step S307: determining whether a device fingerprint pointer table includes the current number of the target device fingerprint pointer; if the result of step S307 is "yes", performing step S309: obtaining a number of history device datasets respectively including a number of second history numbers of the target device fingerprint pointer according to the current protocol address; step S311: comparing the history device dataset with the current device dataset to selectively use one of the second history numbers as the current number of the target device fingerprint pointer; if the result of step S307 is "no", performing step S313: obtaining a history protocol address, a number of first history device features and at least one first history number of the target device fingerprint pointer according to the current protocol address; step S315: determining whether the current protocol address matches the history protocol address; if the result of step S315 is "yes", performing step S317: determining whether the current device features match the first history device features; step S319: using one of the at least one first history number as the current number of the target device fingerprint pointer; and if the result of step S315 or step S317 is "no", performing step S305. It should be noted that, the implementation of steps S301, S305, S315, S317 and S319 of FIG. 3 may respectively be the same as that of step sS201, S211, S205, S207 and S209 of FIG. 2, and the detailed description of steps S301, S305, S315, S317 and S319 are omitted, and steps S303, S307 and S313 of FIG. 3 may correspond to step S203 of FIG. 2.

Similar to the description regarding step S203 of FIG. 2, in step S303, the processor 12 may determine whether the current protocol address of the user device is obtainable to determine whether the current number of the target device fingerprint pointer of the user device may be inferred according to the current protocol address. If the processor 12 is unable to obtain the current protocol address of the user device, the processor 12 may perform step S305; if the processor 12 is able to obtain the current protocol address of the user device, the processor 12 may perform step S307 to further determine whether the device fingerprint pointer table includes the current number of the target device fingerprint pointer.

When the processor 12 determines, in step S307, that the target device fingerprint pointer does not include the current number, the processor 12 may perform step S313 to obtain the history protocol address, the first history device features and the at least one first history number of the target device fingerprint pointer of the user device. On the contrary, when the processor 12 determines, in step S307, that the target device fingerprint pointer includes the current number, the processor 12 may perform step S309.

In step S309, the processor 12 obtains multiple history device datasets including multiple second history numbers of the target device fingerprint pointer respectively according to the current protocol address. Specifically, the data type of the history device dataset may be similar to the data type of the current device data, one history device dataset may include one second history number of the target device fingerprint pointer, wherein the second history number indicates the device fingerprint of the user device previously generated may be obtained from the pointer database of the browser.

In step S311, the processor 12 compares the history device datasets and the current device dataset respectively to obtain the similarity between the content of each history device dataset and the content of each current device dataset, and selectively uses one of the second history numbers of the history device datasets as the current number of the target device fingerprint pointer according to comparison result. In other words, if the comparison result indicates the similarity reaches a threshold, the processor 12 may use the second history number as the current number; if the comparison result indicates the similarity does not reach the threshold, the processor 12 may modify the second history number.

Figure 4:
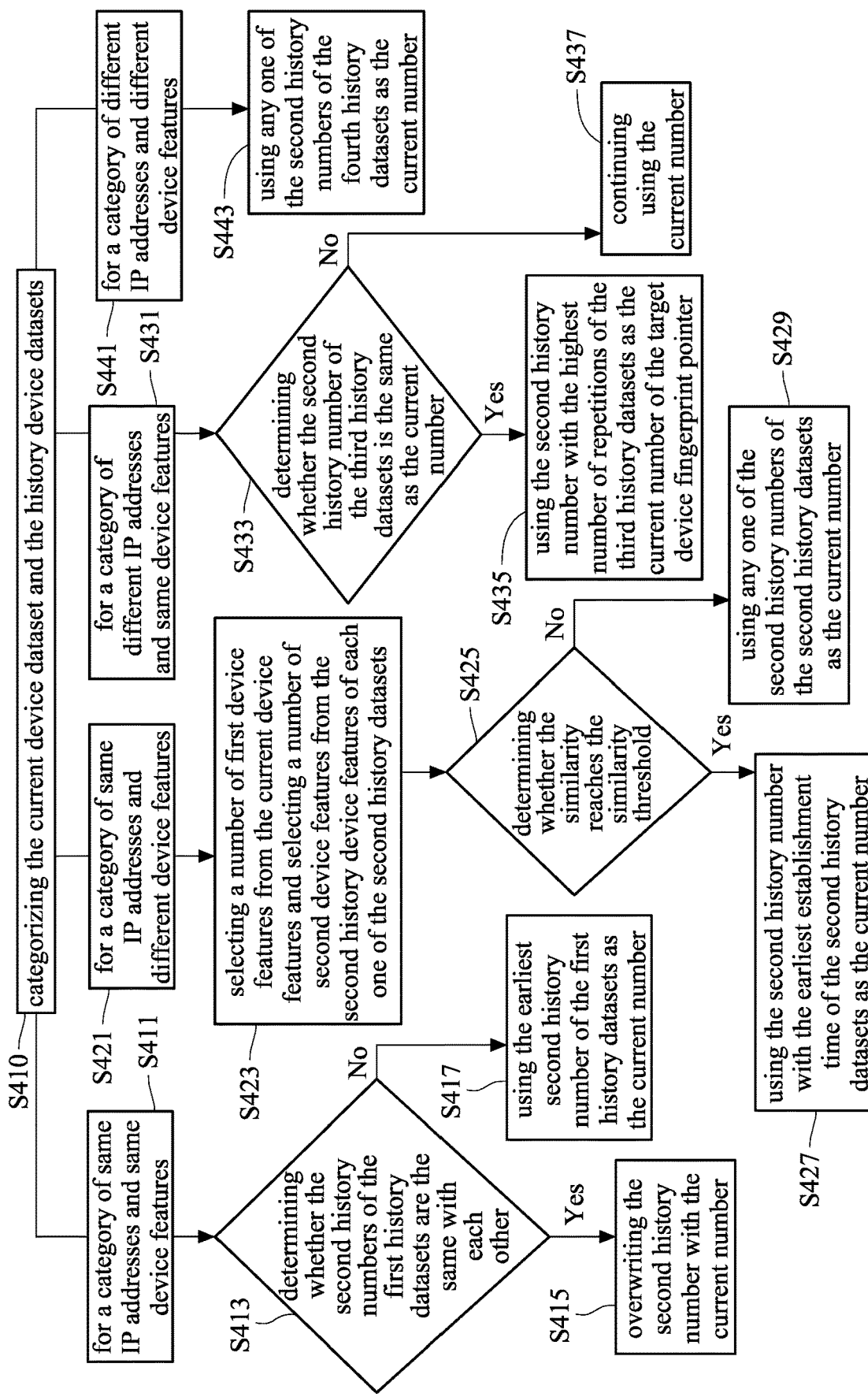
FIG. 4 is a flowchart illustrating a method for inferring device fingerprint according to yet another embodiment of the present disclosure.

To further explain the processor 12 selectively using one of the second history numbers of the history device datasets as the current number of the target device fingerprint pointer, please refer to FIG. 1 and FIG. 4, wherein FIG. 4 is a flowchart illustrating a method for inferring device fingerprint according to yet another embodiment of the present disclosure. Step S311 shown in FIG. 3 may include steps shown in FIG. 4.

First, step S311 of FIG. 3 may include: step S410: categorizing the current device dataset and the history device datasets. In step S410, the processor 12 may compare the current protocol address of the current device dataset and the history protocol address of each history device datasets, compare the current device data of the current device dataset with the history device data of each history device datasets, and categorizes the comparison result into four categories: the first category being the current protocol address is the same as the history protocol address of each one of multiple first history datasets among the history device datasets and the current device dataset is the same as the history device dataset of each one of the first history datasets; the second category being the current protocol address is the same as multiple history protocol address of each one of multiple second history datasets among the history device datasets and the current device dataset is different from the history device dataset of each one of the second history datasets; the third category being the current protocol address is different from the history protocol address of each one of multiple third history datasets among the history device datasets and the current device dataset is the same as the history device dataset of each one of the third history datasets; and the fourth category being the current protocol address is different from the history protocol address of each one of multiple fourth history datasets among the history device datasets and the current device dataset is different from the history device dataset of each one of the fourth history datasets. It should be noted that, for better understanding, the following refers multiple history device features included in each one of the history device datasets as multiple second history device features, and the first history datasets to the fourth history datasets are all or part of the history device datasets obtained in step S309 of FIG. 3, and the first history datasets to the fourth history datasets may be the same with each other or different from each other. The following describes these four categories in sequence.

Method regarding the first group includes: step S411: for a category of same IP addresses and same device features; step S413: determining whether the second history numbers of the first history datasets are the same with each other; if the result of step S413 is "yes", performing step S415: overwriting the second history number with the current number; and if the result of step S413 is "no", performing step S417: using the earliest second history number of the first history datasets as the current number.

When the categorizing result is the history protocol address of each one of the first history datasets among the history device datasets matches the current protocol address and the second history device features of each one of the first history datasets match the current device features (step S411), the processor 12 performs step S413 to determine whether the second history numbers of the first history datasets are the same with each other. If the processor 12 determines the second history numbers of the first history datasets are the same with each other, then in response to the history protocol address of each one of the first history datasets matching the current protocol address and the current device features matching the second history device features of each one of the first history datasets, and the second history numbers of the first history datasets being the same with each other, the processor 12 may perform step S415 to use the current number as the second history numbers of the first history datasets; if the processor 12 determines the second history numbers of the first history datasets are different from each other, then in response to the history protocol address of each one of the first history datasets matching the current protocol address and the current device features matching the second history device features of each one of the first history datasets, and the second history numbers of the first history datasets being different from each other, the processor 12 may perform step S417 to use the second history number with the earliest establishment time of the first history datasets as the current number.

In short, when determining the current device dataset and the first history datasets have the same IP address and the same device features, the processor 12 further determines whether the second history numbers of the first history datasets are pointing to the same device fingerprint. Even if the second history numbers are the same with each other, it still does not necessary mean that the second history numbers and the current number are the same with each other. Therefore, when the processor 12 determines the second history numbers of the first history datasets are pointing to the same device fingerprint, the processor 12 uses the current number to overwrite the second history numbers corresponding to the first history datasets in the pointer database to update the numbers in the pointer database; and when the processor 12 determines the second history numbers of the first history datasets are pointing to different device fingerprints, the processor 12 selects one of the second history numbers with the earliest establishment time corresponding to the first history datasets from the pointer database to overwrite the current number.

The method regarding the second group includes: step S421: for a category of same IP addresses and different device features; step S423: selecting a number of first device features from the current device features and selecting a number of second device features from the second history device features of each one of the second history datasets; step S425: determining whether the similarity reaches the similarity threshold; if the result of step S425 is "yes", performing step S427: using the second history number with the earliest establishment time of the second history datasets as the current number; and if the result of step S425 is "no", performing step S429: using any one of the second history numbers of the second history datasets as the current number.

When the categorizing result is the history protocol address of each one of the second history dataset among the history device datasets matching the current protocol address and the second history device features of each one of the second history datasets matching the current device features (step S421), the processor 12 performs step S423 to select multiple first device features from the current device features and select multiple second device features from the second history device features of each one of the second history datasets, wherein the first device features correspond to each one of the second device features respectively. In other words, the processor 12 may select multiple reference parameters from the 15 parameters listed above in advance, and select the first device features and the second device features according to the reference parameters.

In step S245, the processor 12 determines whether the similarities between the first device features and each one of the second device features reach the similarity threshold. Parameters that the first device features and the second device features correspond to may be selected from the 15 parameters listed above. For example, parameters that the first device features and the second device features correspond to may include the hardware parameters, the browser parameters and operating system name, operating system platform and color depth of the operating system parameters. For example, the similarity threshold may be 60%, and the processor 12 may divide multiple pieces of data of the first device features corresponding to each parameter being the same as data of the second device features corresponding to each parameter by the number of parameters to obtain the similarity, and perform determination based on the calculated similarity and the similarity threshold. If the similarity between the first device features and each of the second device feature reaches the similarity threshold, the processor 12 may perform step S427 to use the second history number with earliest establishment time of the history protocol addresses of the second history datasets as the current number of the target device fingerprint pointer; if the similarity between the first device features and each of the second device features does not reach the similarity threshold, the processor 12 may perform step S429 to use any one of the second history numbers of the history protocol addresses of the second history datasets as the current number of the target device fingerprint pointer.

In short, when the processor 12 determines the current device dataset and the second history datasets have the same IP address and different device features, the processor 12 may select the first device features and the second device features corresponding to the same features from the current device features and the second history device features of each of the second history datasets. Then, when the processor 12 determines the similarity between the first device features and the second device features is high enough (the similarity reaches the similarity threshold), the processor 12 may select the second history number with an earliest establishment time corresponding to the history protocol address from the second history datasets to overwrite the current number; and when the processor 12 determines the similarity between the first device features and the second device features is not high enough (the similarity does not reach the similarity threshold), the processor 12 may directly use any one of the second history numbers of the second history datasets to overwrite the current number.

The method regarding the third group includes: step S431: for a category of different IP addresses and same device features; step S433: determining whether the second history number of the third history datasets is the same as the current number; if the result of step S433 is "yes", performing step S435: using the second history number with the highest number of repetitions of the third history datasets as the current number of the target device fingerprint pointer; if the result of step S433 is "no", performing step S437: continuing using the current number.

When the categorizing result is the history protocol address of each of the third history datasets among the history device datasets not matching the current protocol address and the second history device features of each one of the third history datasets matching the current device features (step S431), the processor 12 performs step S433 to determine whether the second history number of each one of the history protocol addresses corresponding to the third history datasets is the same as the current number, wherein the implementation of step S433 may be the same as that of step S413, and the detail of step S433 is omitted herein. If the processor 12 determines the second history number of each one of the history protocol addresses corresponding to the third history datasets is the same as the current number, the processor 12 may perform step S435 to use the second history number with the highest number of repetitions of the third history datasets as the current number of the target device fingerprint pointer; if the processor 12 determines the second history number of each one of the history protocol addresses corresponding to the third history datasets is different from the current number, the processor 12 may not change the current number. In addition, if the processor 12 determines the second history number of each one of the history protocol addresses corresponding to the third history datasets is the same as the current number, when the processor 12 performs step S435, the processor 12 may further use the second history number with the highest number of repetitions of the third history datasets as the second history number of the third history datasets. That is, the current number of the target device fingerprint pointer and the second history number of the third history datasets are the same with each other.

In short, when the processor 12 determines the current device dataset and the third history datasets have different IP addresses and same device features, the processor 12 further determines whether the second history number of each of the third history datasets and the current number are pointing to the same device fingerprint. When the processor 12 determines the second history number of each of the third history datasets and the current number are pointing to different device fingerprints, the processor 12 selects the second history number with the highest number of repetitions corresponding to the third history datasets from the pointer database to overwrite the current number; and when the processor 12 determines the second history number of each of the third history datasets and the current number are pointing to the same device fingerprint, the processor 12 continues to use the current number read from the pointer database of the browser.

The method regarding the fourth group includes: step S441: for a category of different IP addresses and different device features; and step S443: using any one of the second history numbers of the fourth history datasets as the current number. When the categorizing result is the history protocol address of each of the fourth history datasets among the history device datasets not matching the current protocol address and the second history device features of each of the fourth history datasets not matching the current device features (step S441), the processor 12 performs step S443 to use any one of the second history numbers of the fourth history datasets as the current number of the target device fingerprint pointer, wherein the implementation of step S443 may be the same as that of step S429, the detail of step S443 is omitted herein.

In short, when the processor 12 determines the current device dataset and the fourth history datasets have different IP addresses and different device features, the processor 12 may directly use any one of the second history numbers of the fourth history datasets to overwrite the current number.

In addition to the above description, in an embodiment, steps S411, S421, S431 and S441 may have an order from high to low priority. Therefore, if the categorizing result indicates more than one of the steps S411, S421, S431 and S441 at the same time, the processor 12 may select the step with highest priority. For example, if the categorizing result indicates both categories specified in steps S411 and S421, since the priority of step S411 is higher than that of step S421, the processor 12 may only perform step S413 and its following steps.

Through the above four categories, in a scenario where the same user device operates different user interfaces under different internet environments, the processor 12 may still infer the user device corresponding to this device fingerprint. For example, assuming the user device operates a first browser under the internet environment of the office, and then operates a second browser under the internet environment of the user's house. Then, even if the user device once again enters the internet environment of the office and operates the second browser, through the system and method for inferring device fingerprint according to one or more embodiments of the present disclosure, the device fingerprint of the user device may still be inferred.

In addition to the above description, in another embodiment, if the processor 12 is unable to obtain the current protocol address but the device fingerprint pointer table includes the current number of the target device fingerprint pointer, the processor 12 may continue to use the current number.

Figure 5:
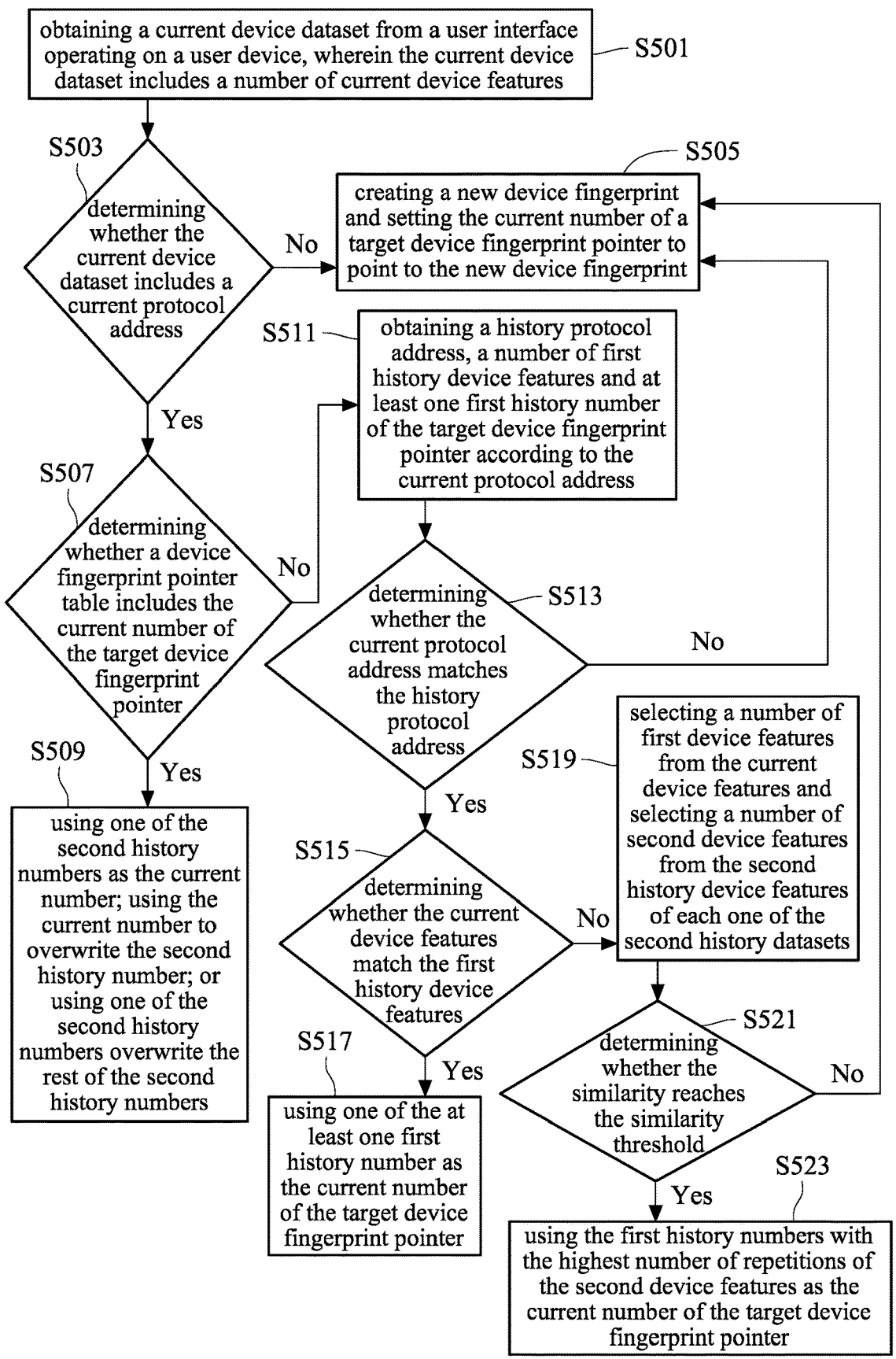
FIG. 5 is a flowchart illustrating a method for inferring device fingerprint according to still an embodiment of the present disclosure.

Please refer to FIG. 1 and FIG. 5, wherein FIG. 5 is a flowchart illustrating a method for inferring device fingerprint according to still an embodiment of the present disclosure. Steps S501, S503, S505, S507, S511, S513, S515 and S517 shown in FIG. 5 may be the same as steps S301, S303, S305, S307, S313, S315, S317 and S319 shown in FIG. 3 respectively, and step S509 of FIG. 5 may be implemented with steps S309 and S311 of FIG. 3, and their detail descriptions are omitted herein for brevity. The difference between FIG. 5 and FIG. 3 includes: if the processor 12 determines the current device features not matching the first history device features in step S515, the processor may perform step S519: selecting a number of first device features from the current device features and selecting a number of second device features from the second history device features of each one of the second history datasets; step S521: determining whether the similarity reaches the similarity threshold; if the result of step S521 is "yes", performing step S523: using the first history numbers with the highest number of repetitions of the second device features as the current number of the target device fingerprint pointer; and if the result of step S521 is "no", performing step S505.

From step S519 to step S525, when the current protocol address matches the history protocol address obtained in step S511 and the current device features does not match the first history device features obtained in step S511, the processor 12 selects multiple first device features from the current device features and selects multiple second device features from the second history device features, wherein the first device features correspond to the second device features respectively. Then, the processor 12 determines the similarity between the first device features and the second device features (step S521), and uses the first history number with the highest number of repetitions corresponding to the second device features as the current number of the target device fingerprint pointer when the similarity between the first device features and the second device features reaches the similarity threshold (step S523); and creating the new device fingerprint and setting the current number of the target device fingerprint pointer to point to the new device fingerprint when the similarity between the first device features and the second device features does not reach the similarity threshold (step S505).

In step S519 and step S521, the processor 12 may select multiple first device features from the current device features and select multiple second device features from the second history device features, and compare the first device features with the second device features to obtain the similarity. When the similarity reaches the similarity threshold, in step S523, the processor 12 may use the first history number with the highest repetition of the second device features corresponding to the similarity reaching the similarity threshold to overwrite the current number. For example, assuming the similarity of four the second device features reaches the similarity threshold, the processor 12 further determines the first history numbers of three of the four second device features are the same. Then, the processor 12 may use said same first history number to overwrite the current number. When the similarity does not reach the similarity threshold, in step S525, the processor 12 may create the new device fingerprint and update the device fingerprint pointer table according to the current number of the target device fingerprint pointer set as pointing to the new device fingerprint.

The implementation of step S519 and step S521 may be the same as that of step S423 and step S425 of FIG. 4, and the implementation of step S523 may be the same as that of step S435 of FIG. 4, details descriptions of step S519, step S521 and step S523 are omitted herein.

The current number and the corresponding current device dataset inferred through one or more embodiments described above may be used as the first/second history number and the history device dataset and stored into the memory 11.

Figure 6:
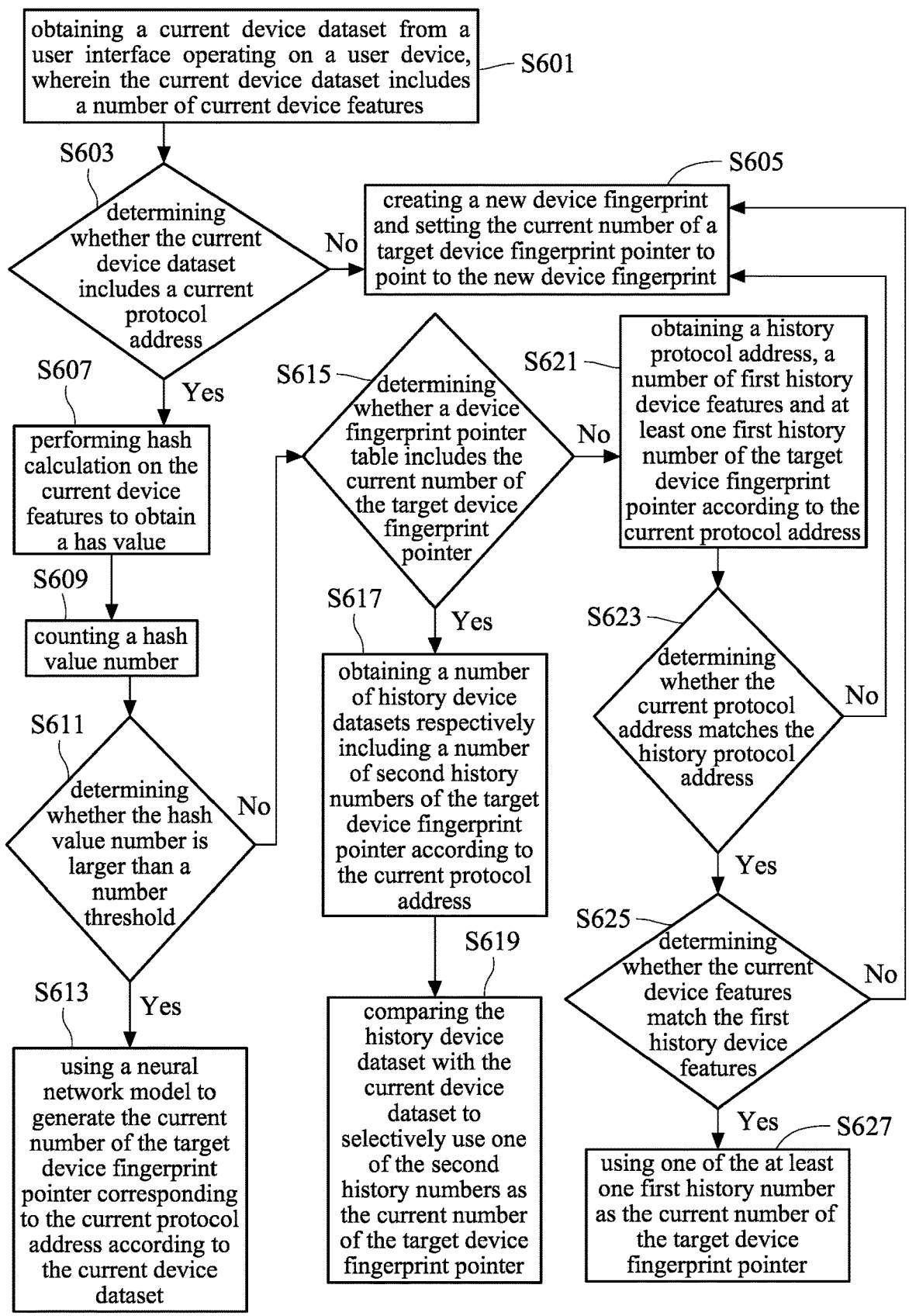
FIG. 6 is a flowchart illustrating a method for inferring device fingerprint according to still another embodiment of the present disclosure.

Please refer to FIG. 6, wherein FIG. 6 is a flowchart illustrating a method for inferring device fingerprint according to still another embodiment of the present disclosure. Steps S601, S603, S605, S615, S617, S619, S621, S623, S625 and S627 in FIG. 6 may be the same as steps S301, S303, S305, S307, S309, S311, S313, S315, S317 and S319 in FIG. 3 respectively, and their detail descriptions are omitted herein for brevity. The difference between FIG. 6 and FIG. 3 includes: if the processor 12 determines the current device dataset includes the current protocol address in step S603, the processor 12 may perform step S607: performing hash calculation on the current device features to obtain a has value; step S609: counting a hash value number; step S611: determining whether the hash value number is larger than a number threshold; if the result of step S611 is "yes", performing step S613: using a neural network model to generate the current number of the target device fingerprint pointer corresponding to the current protocol address according to the current device dataset; and if the result of step S611 is "no", performing step S615.

In step S607, the processor 12 may perform hash calculation on the current device features of the current device dataset to obtain the hash value, wherein the hash calculation may be secure hash algorithm-1 (SHA-1).

In steps S609 and S611, the processor 12 may add "1" to the hash value number and determine whether the hash value number is larger than the number threshold, wherein the number threshold is, for example, 50. In other words, the processor 12 may store a number of times a has value is calculated or control the memory 11 to store the number of times a hash value is calculated, and determine whether the accumulated hash value number is larger than 50.

If the processor 12 determines the hash value number is larger than the number threshold, the processor 12 may perform step S613 to use the neural network model to predict the current number of the target device fingerprint pointer corresponding to the current protocol address according to the current device dataset. The neural network model may include supervised learning model, such as a multilayer perceptron (MLP) model, a decision tree model, a random forest model, a support vector machine (SVM) model or a gradient boosting tree model etc. Said neural network model is trained based on the first history device features and the at least one first history number of the target device fingerprint pointer of the user device stored in the memory 11. In other words, the first history device features may be used as training data on X axis for training the neural network model, the at least one first history number may be used as training data on Y axis for training the neural network model. On the contrary, if the processor 12 determines the hash value number is not larger than the number threshold, the processor 12 may perform step S615.

If the hash value number is larger than the number threshold, it means data amount for inferring the current number is too large. Therefore, the processor 12 may instead use neural network model to predict the current number, thereby reducing computation cost and time spent on inferring the current number.

In view of the above description, through the system and method for inferring device according to one or more embodiments of the present disclosure, when the user interface on the user device switches from one the browser to another browser, switches from a browser to an application, or switches from an application to a browser, an inferred result of the device using this browser or application are the same user device may still be obtained. In addition, in a scenario where multiple user devices with different models are in the same environment (for example, connected to the same wireless network), the device fingerprints of the user devices may still be inferred. In addition, in a scenario where the same user device operates different user interfaces in different internet environments, the device fingerprint of the user device may still be inferred. In addition, when data amount for inferring the current number is too large, the processor may use neural network model to predict the current number, thereby reducing computation cost and time spent on inferring the current number.

What is claimed is:

1. A method for inferring device fingerprint, performed by a processor, comprising:

obtaining a current device dataset from a user interface operating on a user device, wherein the current device dataset comprises a plurality of current device features;

when the current device dataset further comprises a current protocol address and a device fingerprint pointer table does not comprise a current number of a target device fingerprint pointer corresponding to the current protocol address, obtaining a history protocol address, a plurality of first history device features and at least one first history number of the target device fingerprint pointer associated with the user device according to the current protocol address;

when the current protocol address matches the history protocol address and the current device features match the first history device features, using one of the at least one first history number as the current number of the target device fingerprint pointer; and when the current protocol address does not match the history protocol address and the current device features match the first history device features, creating a new device fingerprint and setting the current number of the target device fingerprint pointer to point to the new device fingerprint.

2. The method for inferring device fingerprint according to claim 1, further comprising, performed by the processor:

when the current device dataset further comprises the current protocol address and the device fingerprint pointer table comprises the current number of the target device fingerprint pointer, obtaining a plurality of history device datasets respectively comprising a plurality of second history numbers of the target device fingerprint pointer according to the current protocol address; and comparing the history device dataset with the current device dataset to selectively use one of the second history numbers as the current number of the target device fingerprint pointer.

3. The method for inferring device fingerprint according to claim 2, wherein each one of the history device datasets comprises a plurality of second history device features, and comparing the history device datasets with the current device dataset to selectively use one of the second history numbers as the current number of the target device fingerprint pointer comprises:

when the history protocol address of each one of a plurality of first history datasets among the history device datasets matches the current protocol address, the second history device features of each one of the first history datasets match the current device features, and the second history numbers of the first history datasets are different from each other, using one of the second history numbers with an earliest establishment time of the first history datasets as the current number of the target device fingerprint pointer; and when the history protocol address of the respective one of the first history datasets among the history device datasets matches the current protocol address, the current device features matches the second history device features of each one of the first history datasets, and the second history numbers of the first history datasets are the same with each other, using the current number as the second history numbers of the first history datasets.

4. The method for inferring device fingerprint according to claim 3, wherein the second history device features comprise a plurality of pieces of data corresponding to a device type, a device model, a device brand, a processor architecture, a device pointing method, a maximum touch point, an audio fingerprint, an operating system name, an operating system platform, a screen resolution width, a screen resolution height, a color depth, a language code, a language fingerprint, a browser canvas fingerprint, a font fingerprint, a WebGL fingerprint, a source internet protocol, a request internet protocol and an Intranet internet protocol.

5. The method for inferring device fingerprint according to claim 2, wherein each one of the history device datasets comprises a plurality of second history device features, and comparing the history device datasets with the current device dataset to selectively use one of the second history numbers as the current number of the target device fingerprint pointer comprises:

when the history protocol address of each one of a plurality of second history datasets among the history device datasets matches the current protocol address and the second history device features of each one of the second history datasets does not match the current device features, selecting a plurality of first device features from the current device features and selecting a plurality of second device features from the second history device features of each one of the second history datasets, wherein the first device features correspond to each of the second device features respectively; and when a similarity between the first device features and each one of the second device features reaches similarity threshold, using one of the second history numbers with an earliest establishment time of the history protocol addresses of the second history datasets as the current number of the target device fingerprint pointer.

6. The method for inferring device fingerprint according to claim 5, wherein the second history device features comprise a plurality of pieces of data corresponding to a device type, a device model, a device brand, a processor architecture, a device pointing method, a maximum touch point, an audio fingerprint, an operating system name, an operating system platform, a screen resolution width, a screen resolution height, a color depth, a language code, a language fingerprint, a browser canvas fingerprint, a font fingerprint, a WebGL fingerprint, a source internet protocol, a request internet protocol and an Intranet internet protocol.

7. The method for inferring device fingerprint according to claim 2, wherein each one of the history device datasets comprises a plurality of second history device features, and comparing the history device datasets with the current device dataset to selectively use one of the second history numbers as the current number of the target device fingerprint pointer comprises:

when the history protocol address of each one of a plurality of third history datasets among the history device datasets does not match the current protocol address and the second history device features of each one of the third history datasets match the current device features, and the second history number corresponding to each one of the history protocol addresses is different from the current number, using one of the second history numbers with the highest number of repetitions of the third history datasets as the current number of the target device fingerprint pointer.

8. The method for inferring device fingerprint according to claim 7, wherein the second history device features comprise a plurality of pieces of data corresponding to a device type, a device model, a device brand, a processor architecture, a device pointing method, a maximum touch point, an audio fingerprint, an operating system name, an operating system platform, a screen resolution width, a screen resolution height, a color depth, a language code, a language fingerprint, a browser canvas fingerprint, a font fingerprint, a WebGL fingerprint, a source internet protocol, a request internet protocol and an Intranet internet protocol.

9. The method for inferring device fingerprint according to claim 2, wherein each one of the history device datasets comprises a plurality of second history device features, and comparing the history device datasets with the current device dataset to selectively use one of the second history numbers as the current number of the target device fingerprint pointer comprises:

when the history protocol address of each one of a plurality of fourth history datasets among the history device datasets does not match the current protocol address and the second history device features of each one of the fourth history datasets does not match the current device features, using any one of the second history numbers of the fourth history datasets as the current number of the target device fingerprint pointer.

10. The method for inferring device fingerprint according to claim 9, wherein the second history device features comprise a plurality of pieces of data corresponding to a device type, a device model, a device brand, a processor architecture, a device pointing method, a maximum touch point, an audio fingerprint, an operating system name, an operating system platform, a screen resolution width, a screen resolution height, a color depth, a language code, a language fingerprint, a browser canvas fingerprint, a font fingerprint, a WebGL fingerprint, a source internet protocol, a request internet protocol and an Intranet internet protocol.

11. The method for inferring device fingerprint according to claim 1, wherein the at least one first history number is a plurality of first history numbers, and the method, performed by the processor, further comprises:
when the current protocol address matches the history protocol address and the current device features does not match the first history device features, selecting a plurality of first device features from the current device features and selecting a plurality of second device from the first history device features, wherein the first device features correspond to the second device features respectively;
when a similarity between the first device features and the second device features reaches similarity threshold, using the first history numbers with the highest number of repetitions corresponding to the second device features as the current number of the target device fingerprint pointer; and
when the similarity between the first device features and the second device features does not reach the similarity threshold, creating the new device fingerprint and setting the current number of the target device fingerprint pointer to point to the new device fingerprint.

12. The method for inferring device fingerprint according to claim 1, wherein the user interface is an application interface or a browser interface.

13. The method for inferring device fingerprint according to claim 12, wherein the application interface has an embedded browser.

14. The method for inferring device fingerprint according to claim 1, wherein each one of the current device features and the first history device features comprises a plurality of pieces of data corresponding to a device type, a device model, a device brand, a processor architecture, a device pointing method, a maximum touch point, an audio fingerprint, an operating system name, an operating system platform, a screen resolution width, a screen resolution height, a color depth, a language code, a language fingerprint, a browser canvas fingerprint, a font fingerprint, a WebGL fingerprint, a source internet protocol, a request internet protocol and an Intranet internet protocol.

15. The method for inferring device fingerprint according to claim 1, further comprising, performed by the processor:
when the current device dataset further comprises the current protocol address, performing a hash calculation on the current device features to obtain a hash value;
counting a hash value number;
determining whether the hash value number is larger than a number threshold;
if the hash value number is determined as larger than the number threshold, using a neural network model to generate the current number of the target device fingerprint pointer; corresponding to the current protocol address according to the current device dataset; and
if the hash value number is determined as not larger than the number threshold, determining whether the device fingerprint pointer table comprises the current number of the target device fingerprint pointer corresponding to the current protocol address.

16. The method for inferring device fingerprint according to claim 15, wherein the neural network model is trained based on the history protocol address, the first history device features and the at least one first history number of the target device fingerprint pointer of the user device.

17. A system for inferring device fingerprint, comprising:
a memory configured to store a device fingerprint pointer table, a history protocol address, a plurality of the first history device features and at least one first history number of a target device fingerprint pointer associated with a user device; and
a processor connected to the memory;
wherein the processor configured to perform the method for inferring device fingerprint according to claim 1.

* * * * *